(12) United States Patent
McCarter et al.

(10) Patent No.: US 11,940,295 B2
(45) Date of Patent: Mar. 26, 2024

(54) UNIVERSAL MOUNTING SYSTEM FOR INSULATED INSTRUMENTS

(71) Applicant: Obcorp, LLC, St. Louis, MO (US)

(72) Inventors: Marcus C. McCarter, Catawissa, MO (US); Warren J. Gross, Defiance, MO (US)

(73) Assignee: Obcorp, LLC, St. Louis, MO (US)

( * ) Notice: Subject to any disclaimer, the term of this patent is extended or adjusted under 35 U.S.C. 154(b) by 234 days.

(21) Appl. No.: 17/669,858

(22) Filed: Feb. 11, 2022

(65) Prior Publication Data

US 2022/0163357 A1    May 26, 2022

Related U.S. Application Data

(62) Division of application No. 16/457,420, filed on Jun. 28, 2019, now Pat. No. 11,248,938.

(60) Provisional application No. 62/691,403, filed on Jun. 28, 2018.

(51) Int. Cl.
| | |
|---|---|
| *G01D 11/30* | (2006.01) |
| *B63B 35/44* | (2006.01) |
| *F16L 3/22* | (2006.01) |
| *G01D 11/24* | (2006.01) |
| *G01L 19/04* | (2006.01) |

(52) U.S. Cl.
CPC .............. *G01D 11/30* (2013.01); *B63B 35/44* (2013.01); *F16L 3/22* (2013.01); *G01D 11/24* (2013.01); *G01L 19/04* (2013.01); *B63B 2035/4473* (2013.01)

(58) Field of Classification Search
None
See application file for complete search history.

(56) References Cited

U.S. PATENT DOCUMENTS

| | | | |
|---|---|---|---|
| 4,182,362 A * | 1/1980 | Hewson | G01D 11/30 248/219.2 |
| 8,387,463 B2 * | 3/2013 | Hedtke | G01L 27/007 73/702 |

(Continued)

OTHER PUBLICATIONS

TRACEPAK; Bulletin QLT-TPBR; Jul. 20, 2015.

(Continued)

*Primary Examiner* — Amy He
(74) *Attorney, Agent, or Firm* — Sandberg Phoenix & von Gontard P.C.

(57) ABSTRACT

A universal mounting system for insulated instruments includes a mounting plate which engages openings in mating parts of a self-supporting insulated enclosure. The plate supports the instrument and the enclosure independently and allows all connections to the interior of the enclosure to be made through the plate. The plate is bent to an L-shape, with one leg supported by a support structure and the other leg supporting the instrument and enclosure. A termination of a traced tubing system is housed in an enclosure mounted to an opposite side of the mounting plate. The mounting plate includes a collar, cutouts in mating sections of the enclosure fitting over the collar to mount the enclosure to the mounting plate. Illustratively, the mounting plate includes a mount plate portion connected to a supporting structure, and an instrument plate mounted to the instrument.

8 Claims, 11 Drawing Sheets

(56) References Cited

U.S. PATENT DOCUMENTS

2007/0074582 A1* 4/2007 Santos .................. G01D 11/30
73/856
2018/0100778 A1 4/2018 Gross et al.

OTHER PUBLICATIONS

QLT-OBP-BESTP—O'Brien Analytical Bulletin Apr. 5, 2003—Integrated Solutions Improving Process Accuracy—Best Practices: Right Way / Wrong Way.
VIPAK; Bulletin QLT-VPBR-01; May 15, 2015.
QLT-OBP-ENCLOS—O'BrienAnalytical Bulletin Apr. 20, 2014—Integrated Solutions Improving Process Accuracy—VIPAK: Versatile Instrument Package.
QLT-TRAKMOUNT—O'BRIENanalytical Bulletin Dec. 1, 2012—Integrated Solutions Improving Process Accuracy—VIPAK Enclosures Featuring TRAKMOUNT.
HEATPAK; Bulletin QLT-HPSEL-2; Feb. 20, 2000.
HEATPAK II Flexible Instrument Heating Package; Bulletin QLT-HPIIBR-7; Mar. 10, 2000.
HEATPAK II and Flexible HEATPAK—Installation Instructions; QLT HPII-FHP-INST; Aug. 25, 2005.
Instrumentation Solutions; Bulletin QLT-OBIBR; May 20, 2013.

* cited by examiner

UNIVERSAL MOUNTING SYSTEM FOR INSULATED INSTRUMENTS

CROSS-REFERENCE TO RELATED APPLICATIONS

This application is a divisional of U.S. non-provisional application Ser. No. 16/457,420, filed Jun. 28, 2019, now U.S. Pat. No. 11,248,938, which claims priority to U.S. Provisional Patent Application Ser. No. 62/691,403, filed Jun. 28, 2018, both of which are hereby incorporated by reference.

STATEMENT REGARDING FEDERALLY SPONSORED RESEARCH

Not applicable.

BACKGROUND OF THE INVENTION

The present invention relates to a support system for positioning and supporting process monitoring instruments and process control instruments in an insulated container.

In many applications, including off-shore platforms and on-shore refineries, chemical plants, and the like, conduits such as tubes, tubing bundles, and the like, are routed through the facility. The conduits carry not only process fluids, but also other fluids such as samples and process control fluids. The tubing is connected to numerous process monitoring, measuring, and control instruments, such as pressure and differential pressure instruments, gas analyzers, oxygen sensors, fluid temperature sensors, flow meters, and the like. These process instruments are frequently mounted to a manifold having one, two, three, or more tubing connections. The instrument is supported, either directly or through its manifold, by a bracket, which is in turn supported by a support structure such as an instrument stand (stanchion) or a structural element such as a wall, beam, column, process flange, or process line.

In many situations, it is desirable to protect the conduits and the instruments from adverse ambient conditions, for example to prevent freezing or congealing of the fluids in them or else to maintain the temperature of the fluid and the instrument within a predetermined range of temperatures. In those situations, the tubing and/or the instruments, or the wetted portion of the instruments, are enclosed in insulation, and may be provided with heating in the form of electrical or steam tracing.

A convenient and effective system for insulating and heating the conduit or conduits is sold by O'Brien/Ametek under the registered trademark TRACEPAK. The TRACEPAK® system is described in its bulletins QLT-TPBR (20 Jul. 2015) and QLT-OBA-BESTP (25 Apr. 2003).

Convenient and effective systems for insulating and heating process instruments are sold by O'Brien/Ametek under the registered trademark VIPAK. The VIPAK® system includes a two-piece rigid foam enclosure. It is described in its bulletins QLT-VPBR-01 (15 May 2015) and QLT-OBA-ENCLOS (20 Apr. 2014). Alternative mounting systems for the VIPAK® insulated containers are sold under the registered mark TRAKMOUNT, as described in O'Brien/Ametek bulletin QLT-TRAKMOUNT (1 Dec. 2012). Some typical installations including a process instrument and VIPAK® insulated containers are described in Gross, et al., Published Application No. US 2018/0100778 A1, published Apr. 12, 2018.

In other situations, only the wetted portions of the instrument need to be insulated, and a transmitter portion is left exposed to ambient. This may be accomplished with an O'Brien/Ametek HEATPAK® enclosure, as described in its bulletin QLT-HPSEL-2 (20 Feb. 2000).

In yet other situations, requiring less insulation or requiring insulation of an existing instrument in a limited space, a flexible or semiflexible insulation package, such as a HEATPAK II enclosure supported by the instrument itself is used, as described in O'Brien/Ametek bulletins HPIIBR-7 (10 Mar. 2000) and QLT_HPII-FHP-INST (25 Aug. 2005). In most situations, a rigid (self-supporting) enclosure is preferable.

Systems using these components are described in O'Brien/Ametek bulletin QLT-OBIBR (20 May 2013).

A review of the foregoing literature and patent application shows that each instrument installation, to achieve maximum insulation, requires a rigid, self-supporting enclosure. Installation of such an instrument enclosure requires careful modification of the enclosure to accommodate the tubing and wiring serving the instrument and any heater in the enclosure. It also requires careful mounting of the instrument within the enclosure. Changing either the enclosure or the instrument may require careful disassembly and reassembly of both the instrument and the enclosure.

To protect the insulated and traced tubing to which the instrument is attached from freezing or temperature extremes, the insulation around the tubing is continued through an opening in the enclosure, or else an entry seal such as an O'Brien TPKES heat shrink entry seal or an O'Brien TPKHS heat shrink boot is applied over the end of the insulation.

Attempts have been made to simplify mounting of instruments and insulated enclosures. One example is the Shell MESC (Material and Equipment Standards and Code) system. An implementation of that system is described in Parker Hannifin Corporation Catalogue 4190-MESC. Another attempt to simplify mounting of instruments and insulated enclosures is described in Intertec SAFE LINK sheet DD310-0e (undated), INTERTEC-Hess GmbH, Neustadt/Donau, Germany, in which at least one tube passes through a FLEXIPASS R seal into a MINIBOX enclosure. Variations are shown in Intertec sheet KD-381 (undated), "MINIBOX 21 Applications."

SUMMARY OF THE INVENTION

The present invention provides a universal mounting system for insulated instruments. The system includes a mounting plate which supports the instrument and supports the enclosure independent of each other and allows all connections to the interior of the enclosure to be made through the plate. In an embodiment, the plate is bent to an L-shape.

In an embodiment, a termination of a traced tubing system is housed in an enclosure mounted to an opposite side of the mounting plate.

In an embodiment, the mounting plate includes a collar. A marginal cutout in one or both of two mating sections of the enclosure fits over the collar to mount the enclosure to the mounting plate. To provide stable orientation of the enclosure, it is preferred that the collar and openings are non-circular.

In an embodiment, the mounting plate includes a mount plate portion connected to a supporting structure, and an instrument plate mounted to the instrument. Mating the instrument plate to the mount plate provides a simple way to support the instrument independent of the enclosure. All elongate elements (fluid conduits and electrical wires) extending into the enclosure from outside the enclosure extend through at least one of the joined plates. The joined plates provide a seat for mounting the enclosure independent of the instrument.

In an embodiment, a collar on the mounting plate engages a cutout in at least one section of the enclosure and supports the enclosure. In an embodiment, the collar is on a mount plate portion of the mounting plate, and protrusions on the mount plate and instrument plate prevent the enclosure from slipping off the collar.

In an embodiment, an insulated termination container is mounted to a side of the mounting plate opposite the instrument plate.

Because the instrument and the enclosure are supported independent of each other, replacement of either the enclosure or some or all of the instrument is simplified.

Further, most installations can be accommodated with either a vertically oriented or a horizontally oriented enclosure. The number of distinct enclosures inventoried at a facility can therefore be reduced significantly.

Other aspects of the invention will be apparent to those skilled in the art in light of the following description of illustrative embodiments of the invention.

BRIEF DESCRIPTION OF THE SEVERAL VIEWS OF THE DRAWINGS

In the accompanying drawings which form part of the specification.

DESCRIPTION OF THE PREFERRED EMBODIMENT(S)

The following detailed description illustrates the invention by way of example and not by way of limitation. The description clearly enables one skilled in the art to make and use the invention, and describes several embodiments, adaptations, variations, alternatives, and uses of the invention, including what is presently believed to be the best mode of carrying out the invention.

Figure 2:
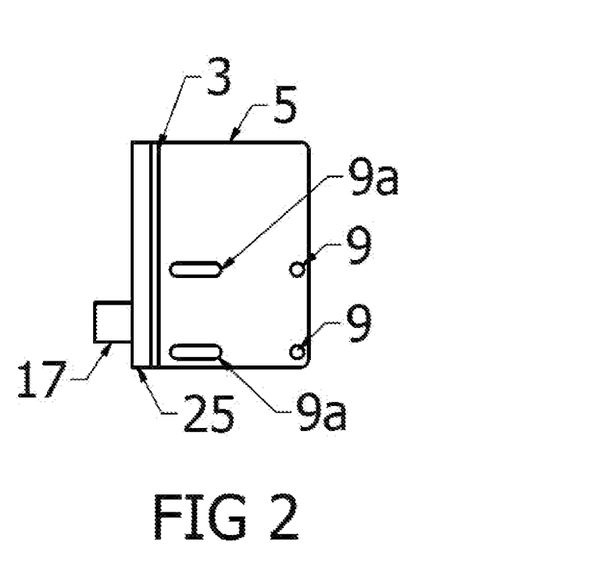
FIG. 2 is a view in side elevation of a mount plate of the present invention.
Figure 3:
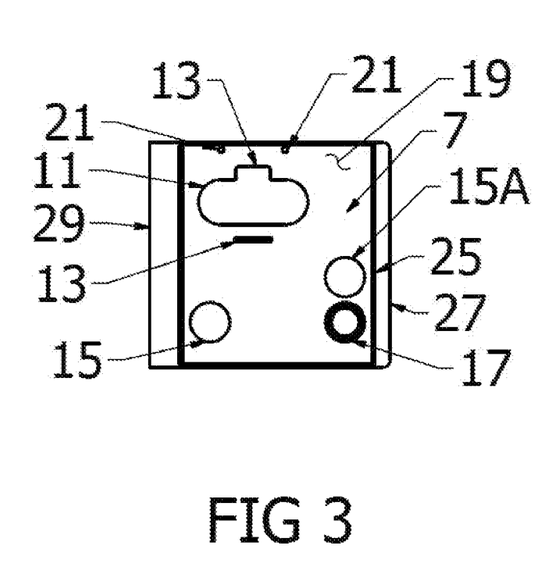
FIG. 3 is a view in front elevation of the mount plate of FIG. 2.
Figure 4:
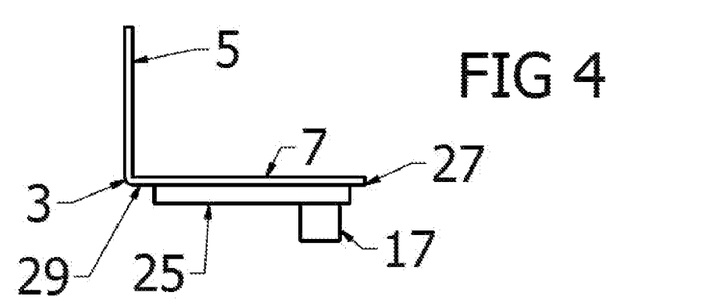
FIG. 4 is a top plan view of the mount plate of FIGS. 2 and 3.
Figure 5:
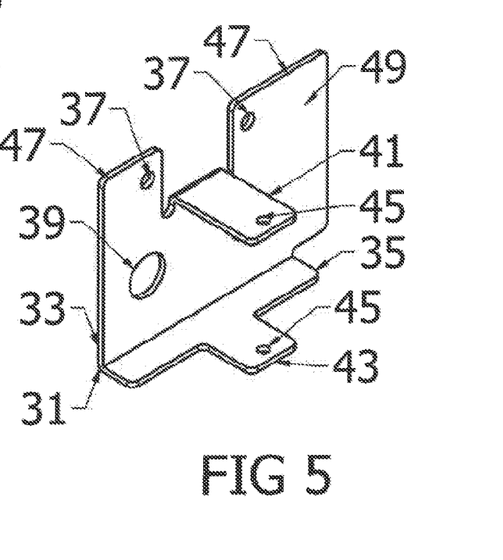
FIG. 5 is a view in perspective of an instrument plate of the present invention.
Figure 6:
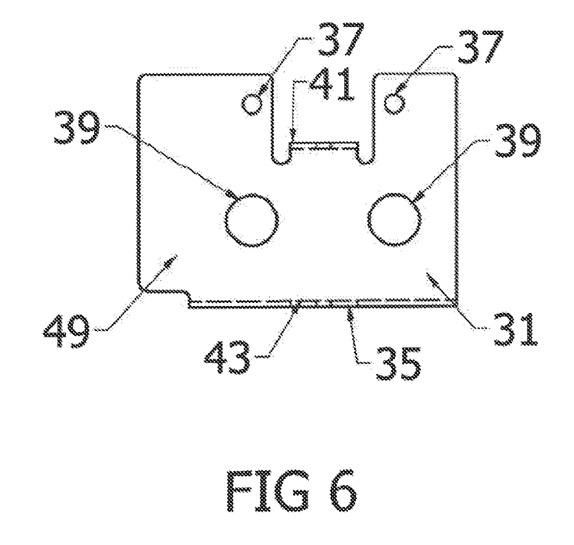
FIG. 6 is a view in rear elevation of the instrument plate of FIG. 5.
Figure 7:
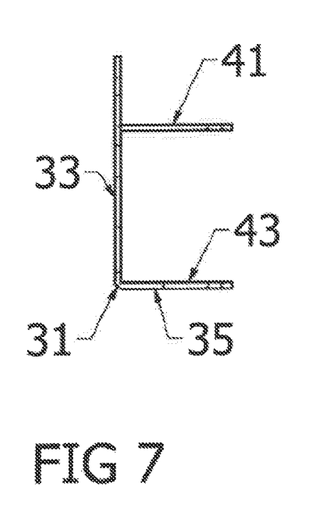
FIG. 7 is a view in side elevation of the instrument plate of FIGS. 5 and 6.
Figure 8:
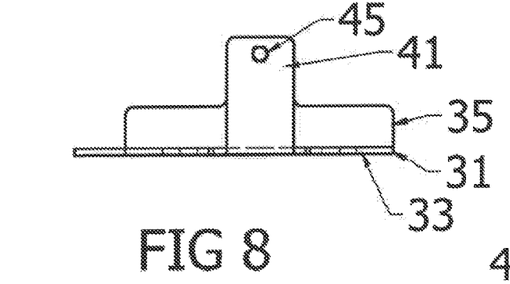
FIG. 8 is a top plan view of the instrument plate of FIGS. 5-7.

As shown in the Figures, in an embodiment, a mounting system 1 of the present invention includes a mount plate 3, shown in more detail in FIGS. 2-4. The mount plate 3 has a first leg 5 bent substantially at right angles to a second leg 7. The first leg 5 includes two bolt holes 9 and two elongate bolt holes 9a arranged in a square pattern, to allow the mount plate 3 to be mounted with the second leg 7 in either a substantially vertical or a substantially horizontal orientation. The second leg 7 includes an elongate opening 11, slots 13 above and below the opening 11, two wiring openings 15 and 15a, an electrical pipe coupling 17 extending from a first face 19 of the second leg 7, and two bolt openings 21. A generally rectangular spacer collar 25 is welded to the first face 19 of the second leg 7. The spacer collar 25 is substantially flush with a top and bottom margin of the leg 7, and is spaced from the free side 27 and from the bent side 29 of the leg 7. As best seen in FIGS. 2 and 4, the collar 25 has a width substantially equal to the wall thickness of an insulated enclosure to be mounted to the mounting system 1. The collar 25 surrounds all of the openings 11, 13, 15, 15a, 17, and 21, in the mount plate leg 7.

The mounting system 1 also includes an instrument plate 31, as shown in detail in FIGS. 5-8. The instrument plate 31 includes a generally planar plate body 33 having a lower flange 35 with a depth substantially equal to the width of the collar 25. Bolt openings 37 are spaced apart to match the spacing of bolt openings 21 in the mount plate 3, but are spaced farther from the upper margin of the instrument plate 31 than the bolt openings 21 are spaced from the upper margin of the mount plate 3. Tubing openings 39 in the plate body 33 are spaced apart a distance equal to the spacing between inlet and outlet tube fittings on an instrument to be mounted by the instrument plate 31; the size of the elongate opening 11 of the mount plate 3 is chosen to accommodate all common such spacings. An upper ear 41 is bent from the plate body 33, and a lower ear 43 is formed as an extension of the flange 35. The ears 41 and 43 are sized and spaced to extend through the slots 13. Screw holes 45 are formed in the upper ear 41 and lower ear 43. The portions 47 of the instrument plate 31 above the bolt holes and a laterally extending portion 49 of the instrument plate 31 are proportioned to extend beyond the collar 25 when the mounting system is assembled, as described below.

Figure 1:
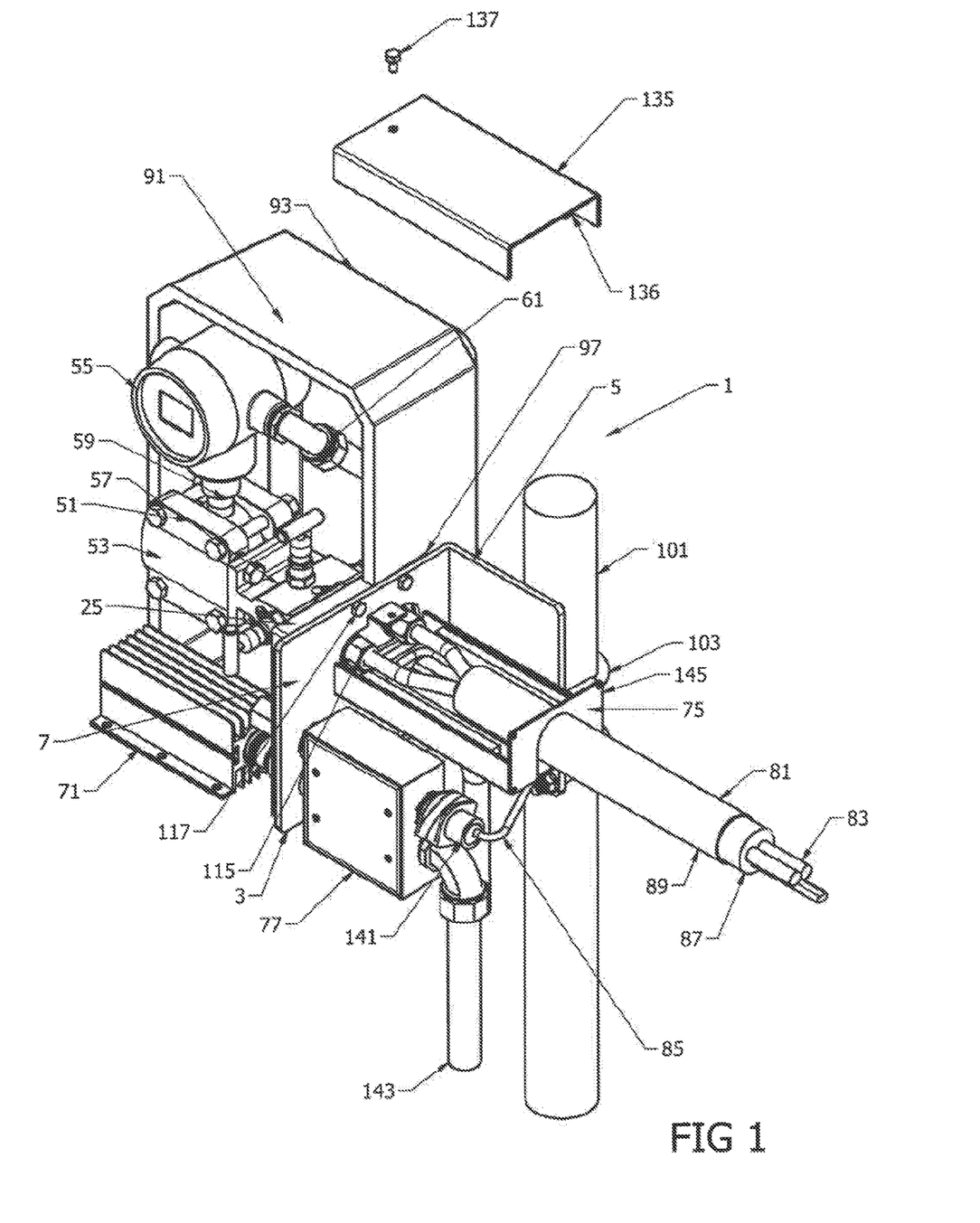
FIG. 1 is a view in perspective of one embodiment of a universal mounting system of the present invention, with one half of an insulated instrument enclosure removed.
Figure 1A:
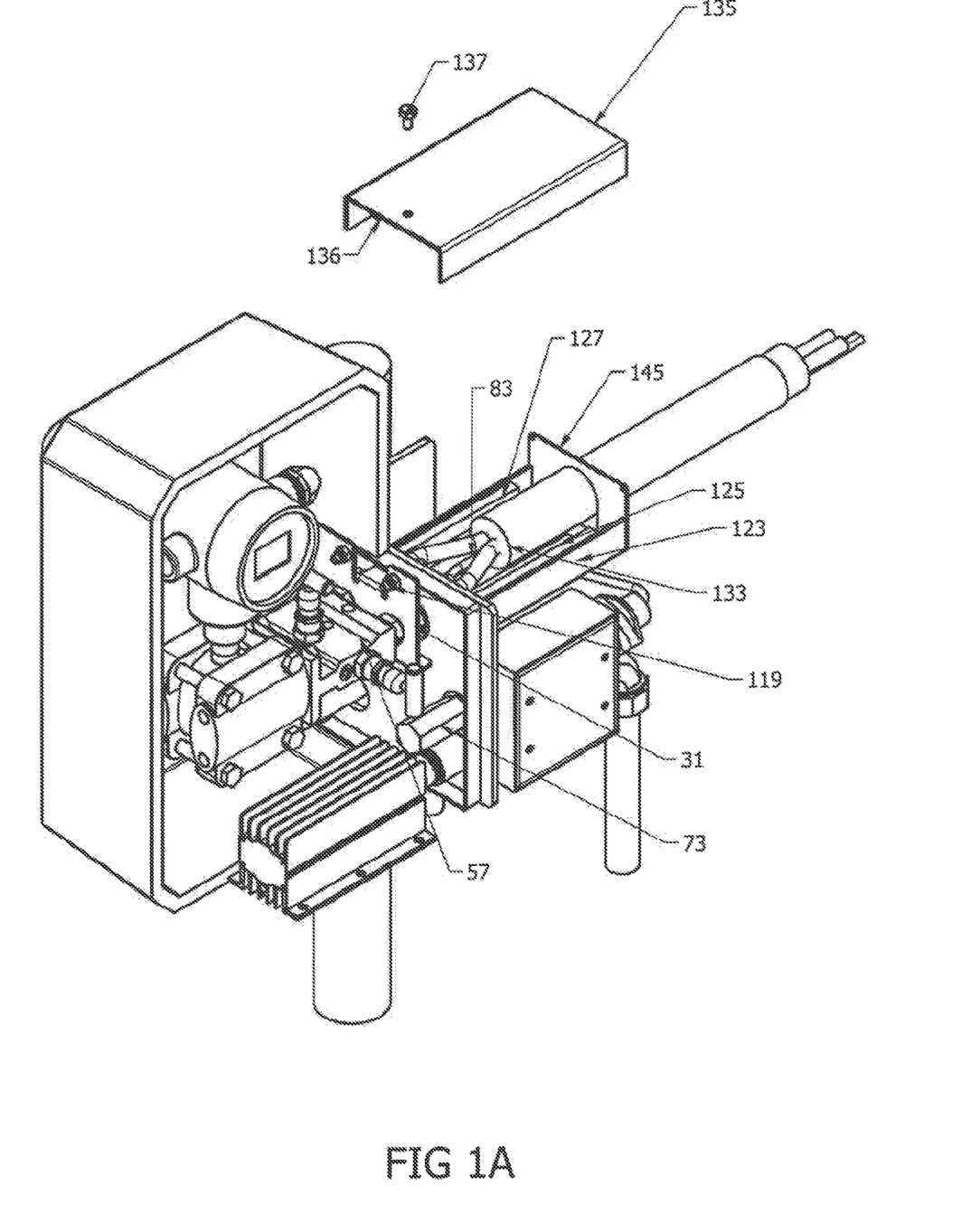
FIG. 1A is a view in perspective of the system of FIG. 1, shown from an opposite side of the system.

As shown in FIGS. 1 and 1A, in a typical installation, an instrument 51 to be mounted by the system of the invention to one side of the mount plate 3 may include a wetted body 53, an electronic display and transmitter 55, and a manifold 57. The manifold 57 is attached directly to the body 53, and the display/transmitter 55 is mounted to the body by a neck 59. An electrical line 61 is attached to the display/transmitter 55 for powering the display/transmitter and for carrying control and output signals. An electric heater 71 and a thermostat 73 are mounted to the same side of the mount plate leg 7.

On the opposite side of the mount plate leg 7 are mounted an insulated termination casing or box 75 and an electrical junction box 77.

The insulated box 75 illustratively includes a metal tray 121 with upstanding sides 123 connected by a web 125. A U-shaped foam insulation insert 127 lines the tray. A non-conductive gasket 129 is interposed between the leg 7 of the mount plate 3 and the end of the box 75. A foam gasket 131 forms an end closure for the box 75, and an end plate 145 is attached to the free end of the tray 121 to protect and position the foam gasket 131. The box 75 also includes a foam-lined lid 135 fitted with depending insulation 136.

The insulated termination box 75 carries an end of a tubing bundle 81. The tubing bundle 81 illustratively includes two tubes 83 and a tracing wire 85, all wrapped in flexible insulation 87 and covered with a polymeric jacket 89. Within the termination box 75, the jacket 89 is cut away, and the tubes 83 are bent outwardly apart to match the spacing of input and output fittings in the manifold 57, as described hereinafter. Because the tubes 83 are spread in the insulated termination box 75, the manifold 57 may be close-coupled to the plate 3, and the required size of an insulated enclosure around the instrument is minimized. It will be understood that rather than bending the tubes 83, an adapter may be utilized.

An illustrative insulated enclosure 91 is formed of rigid, self-supporting foam. The illustrative enclosure 91 is a modification of a VIPAK® B Series enclosure. The enclosure 91 includes two mating sections 93 and 95 (FIGS. 1, 1A, 14, and 15), each with a cutout 97 and 99, respectively, in its free edge. The sections are sized and shaped to form a rigid weather-proof insulated enclosure around the instrument 51 when the sections 93 and 95 are joined along their free edges. The cutouts 97 and 99 are sized and shaped to engage the collar 25 snugly when the sections 93 and 95 are joined. The sections are illustratively joined by latches 147. Other conventional joining systems, such as cinch belts or hook-and-loop straps, may be utilized.

The remainder of the construction is seen more clearly in FIGS. 9-14, showing assembly of the system 1.

Figure 9:
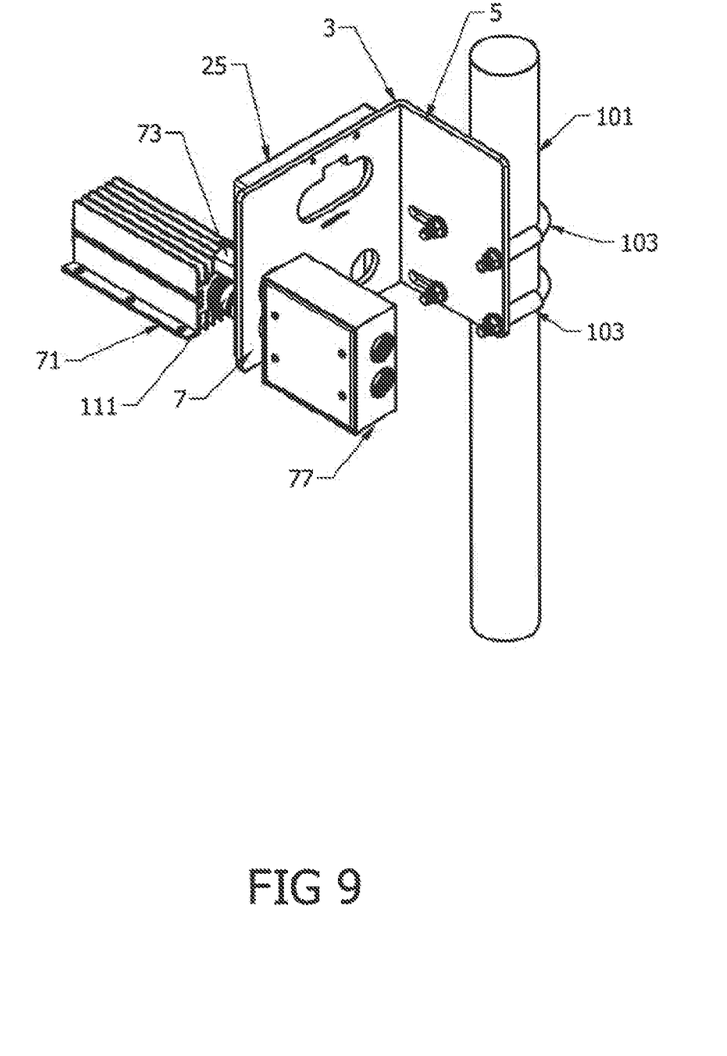
FIG. 9 is a view in perspective of the mount plate of FIGS. 2-4, mounted to an upright post of an instrument stand, and carrying an electric junction box, a heater, and a thermostat.

As shown in FIG. 9, the mount plate 3 is mounted to a post 101 of an instrument stand by U-bolts 103 extending through the openings 9 and 9a in the first leg 5 of the mount plate 3. It will be appreciated that the mount plate 3 could be mounted with the second leg 7 in either a generally horizontal or a generally vertical orientation, as required by the instrument 53 to be mounted to it.

Figure 12:
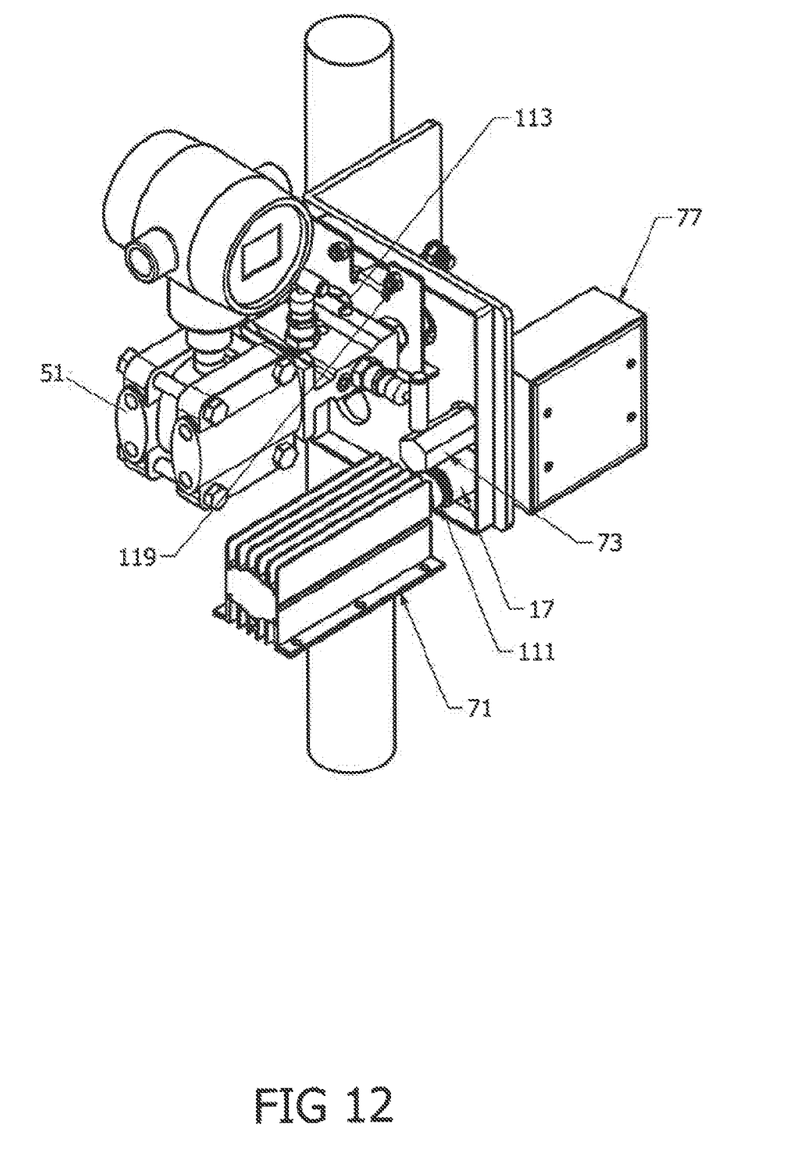
FIG. 12 is a view in perspective, corresponding generally to FIG. 1A, of the mounting system of FIG. 11.
Figure 13:
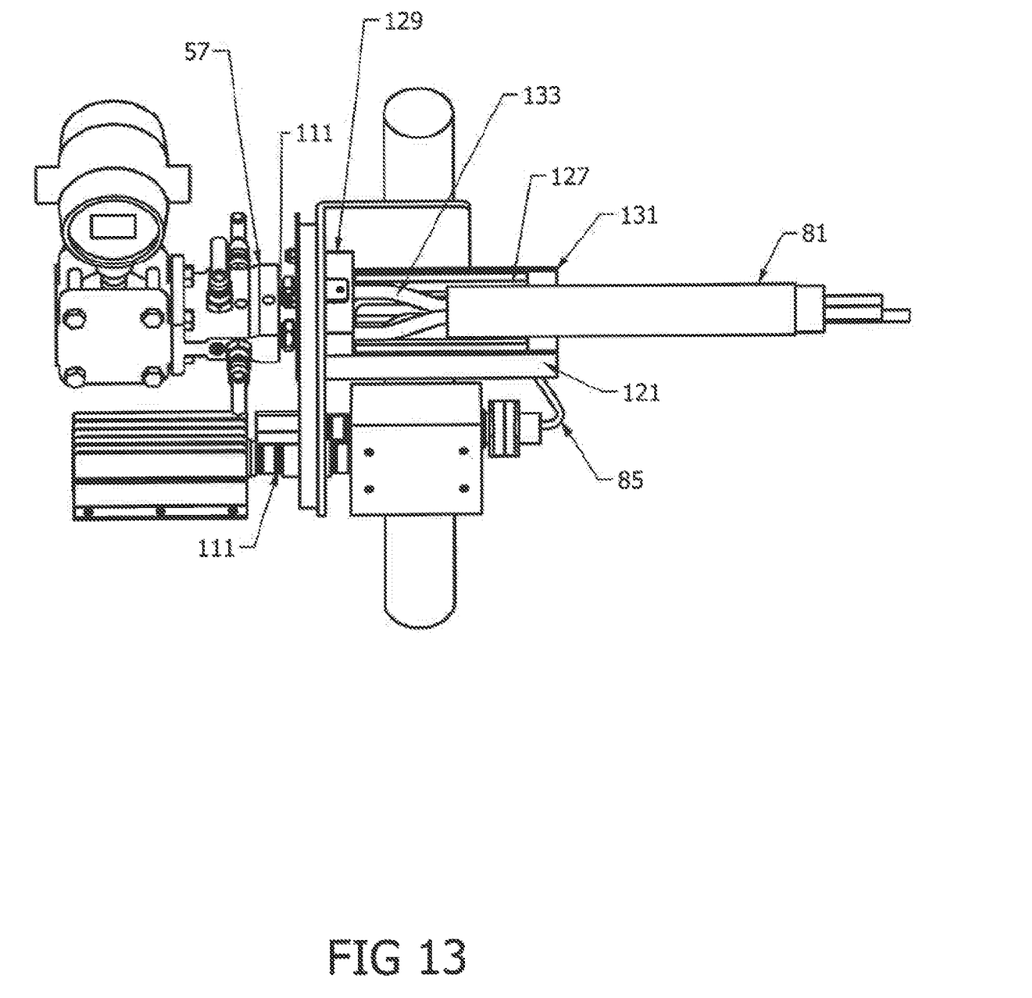
FIG. 13 is a view in perspective of the mounting system of FIGS. 1-12, showing the connection of an insulated tubing bundle through an insulated termination casing mounted to an opposed side of the mount plate.

As shown particularly in FIGS. 9 and 12, the heater 71 is connected by a pipe stub to pipe coupling 17 and is supported by it. Wires from the heater 71 extend through the pipe coupling 17 into the junction box 77, from which the wires extend to a power source, not shown. The thermostat 73 is supported by a pipe stub extending through one of the openings 15a and secured by nuts 101 on either side of the leg 7. Wiring for the thermostat extends through the pipe stub into junction box 77, from which it extends to a power source, not shown, and a controller, not shown, for the heater 71. It will be seen that this arrangement seals the openings 15a and 17 through the mount plate 3.

Figure 10:
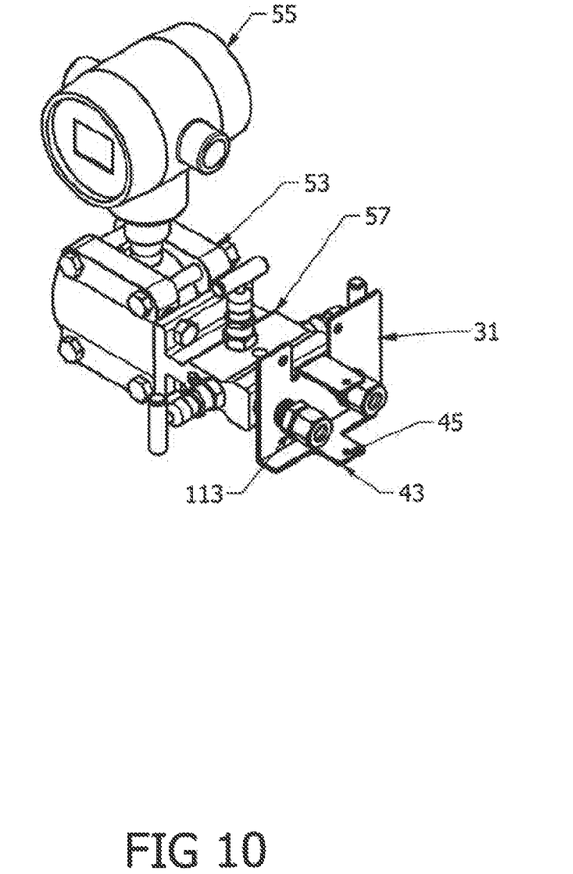
FIG. 10 is a view in perspective of an instrument and its manifold mounted to the instrument plate of FIGS. 5-8.

As best shown in FIG. 10, the manifold 57 of instrument 51 is mounted to the instrument plate 31 by pipe stubs 111 threaded into fittings in the manifold 57. The pipe stubs 111 are sufficiently heavy-walled to support the instrument 51 and are generally heavier-walled than the tubes 83. A nut 113 is threaded onto each pipe stub 111, the pipe stubs 111 are inserted through the openings 39 in the instrument plate 31, and a second nut 113 is threaded onto the pipe stubs 111. The nuts 113 are then tightened to lock the instrument plate 31 to the pipe stubs 111. Compression fittings 115 are threaded to the free ends of the pipe stubs 111. The compression fittings 115 are constructed and proportioned to form a fluid-tight fit with the tubes 83. The instrument 51 is thus supported by the instrument plate 31.

Figure 11:
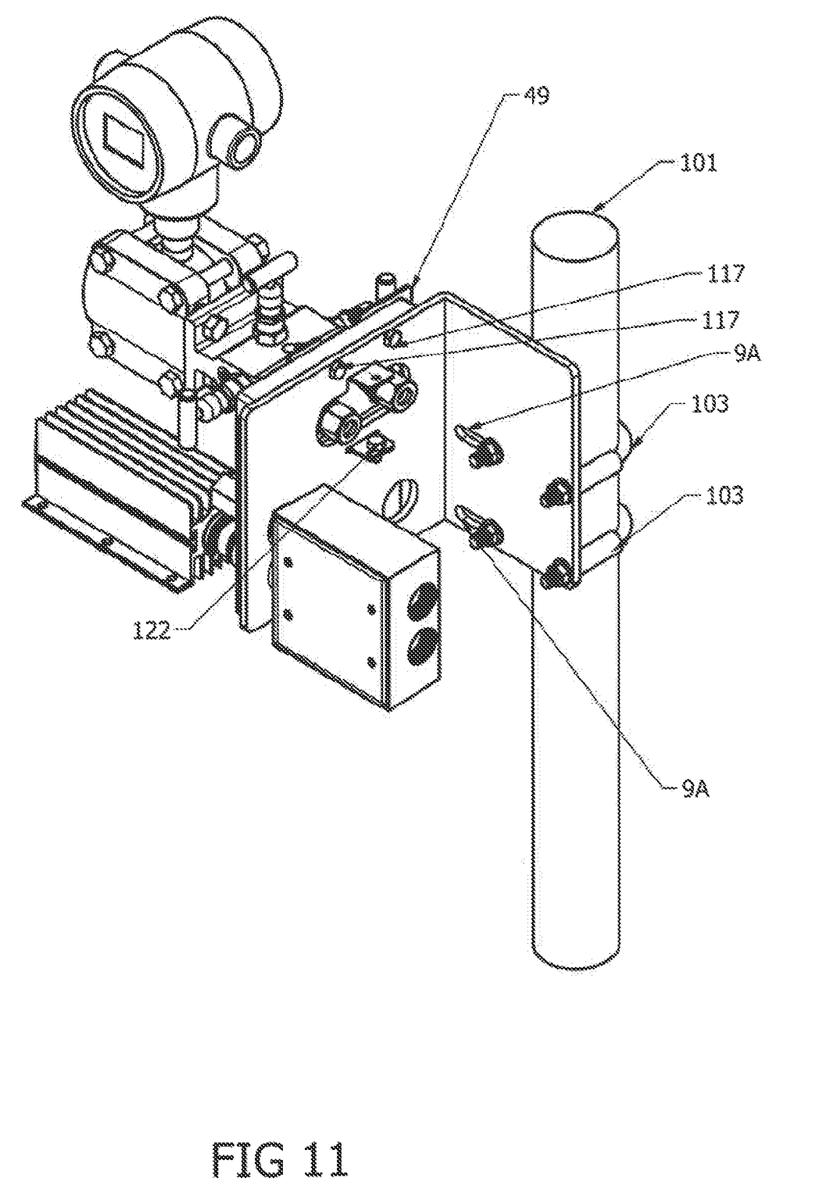
FIG. 11 is a view in perspective of the instrument and instrument plate of FIG. 10 being mated to the mount plate of FIG. 9 to form a mounting system for mounting the instrument to the post.

As shown in FIGS. 11 and 12, the instrument plate 31 is then mounted to the mount plate 3 by extending the tongues 41 and 43 through the slots 13 in the mount plate 3 and fixing the instrument plate 31 to the mount plate 3 with bolts 117 extending through bolt openings 21 and 37 in the mount plate 3 and instrument plate 31, respectively. The bolts 117 are held by nuts 119. It will be seen that at this point in the assembly process, the instrument 51 is securely mounted to the mount plate 3, and the compression fittings 115 and the tongues 41 and 43 extend through the leg 7 of the mount plate 3 to the front side of the leg 7 of the mount plate 3. The instrument plate 31 sits flush with the back wall of the collar 25, and both its upper portions 47 and its lateral extension 49 extend a short distance beyond the collar 25. It will be seen that the instrument plate 31 does not extend over the openings 15 and 15a, or over the pipe coupling 17, thereby positioning the instrument 51 clear of the heater 71 and thermostat 73. The line 61 from the transmitter/display 55 is run through a grommet in opening 15, either through the junction box 77 or through a separate data/control line, to monitoring and control equipment, not shown.

As shown in FIGS. 1, 1A, 11, and 13, the tray 121 of insulated box 75 is mounted to the lower ear 43 by a bolt 122 through the bolt opening 45 in the lower ear 43 of the instrument mounting plate 31 and a complementary bolt opening in the web 125 of the tray 121. The U-shaped foam insulation insert 127 leaves room for the outwardly bent arms of the tubes 83 and for the tracing line 85. Within the body 121, the traced tubing bundle 81 is run through the foam gasket 131 at the free end of the box 75. The insulation 87 and jacket 89 the jacket 89 are cut away, a heat-shrinkable boot 133 is slipped over the tubes 83 and tracer wire 85, and the tubes 83 are bent outwardly apart to match the spacing and orientation of the compression fittings 115. The boot is shrunk to the end of the cut insulation 85 and jacket 87. The ends of the tubes 83 are inserted into the compression fittings 115, and the fittings 115 are tightened. The tracer wire 85 is run out the free open end of the box 75 and connected through a fitting plug 141 to a powered wire, not shown, in the junction box 77. It will be seen that both the tracing wire 85 and the heater 71 may be powered by the same source, indicated generally at 143 in FIG. 1. The gasket 131 is pushed into place at the free end of the box 75. The foam-lined lid 135 is fitted with its depending insulation 136 friction fitted between the arms of the insulation 127, and the lid 135 is secured with a screw 137 through the lid 135 and the bolt hole 45 of upper ear 41 of the instrument plate 31. The end plate 145 (FIG. 1) is attached to the free end of the box 75 to protect and position the foam gasket 131.

It will be seen that the mounting system 1 independently mounts the tubing bundle 81 and the instrument 51 to the mounting plate 3, which is itself independently mounted to pipe 101. Therefore, either the tubing bundle 81 or the instrument 51 can be removed and replaced without disturbing the other.

Figure 14:
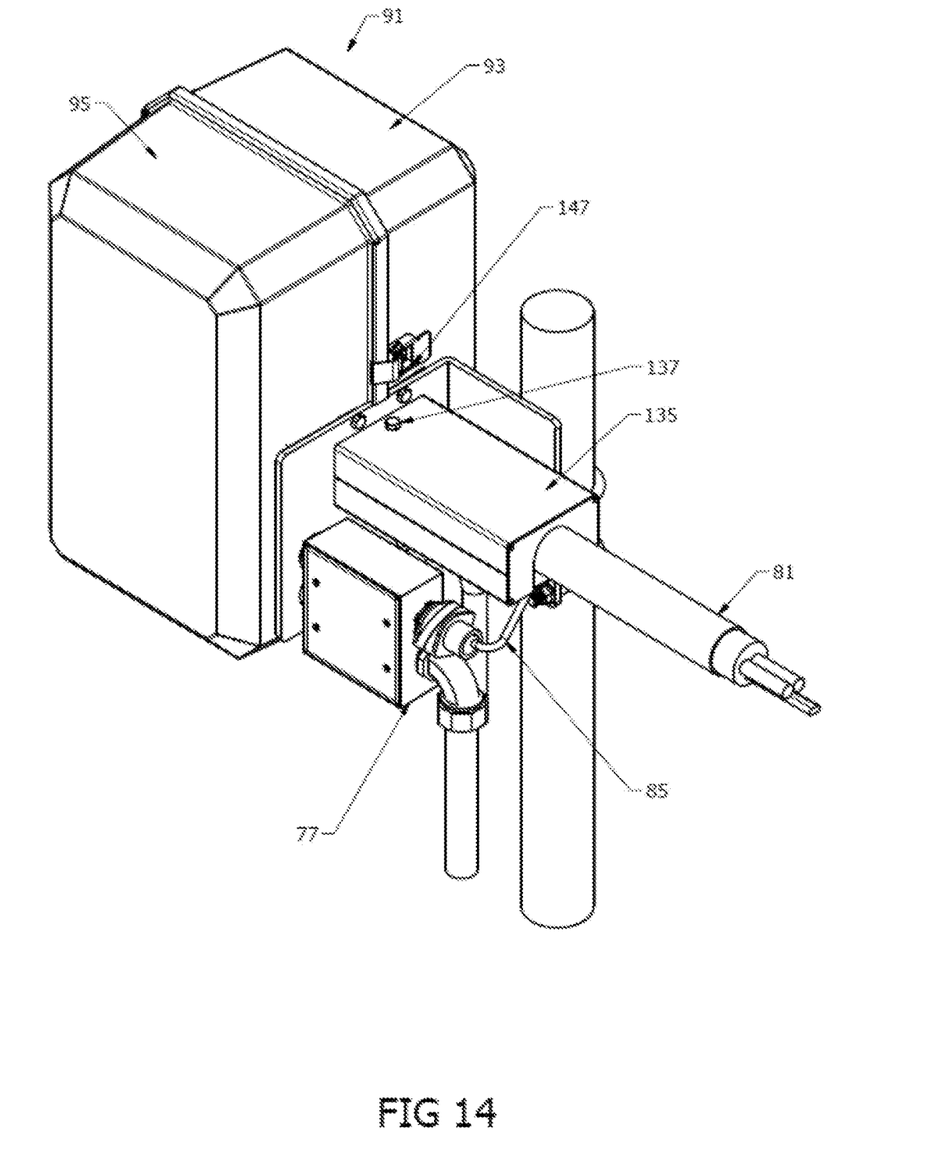
FIG. 14 is a view in perspective, corresponding generally to FIG. 1, of the fully assembled mounting system of FIG. 12, showing a top installed on the mounting sleeve and an insulated enclosure installed on the mount plate.
Figure 15:
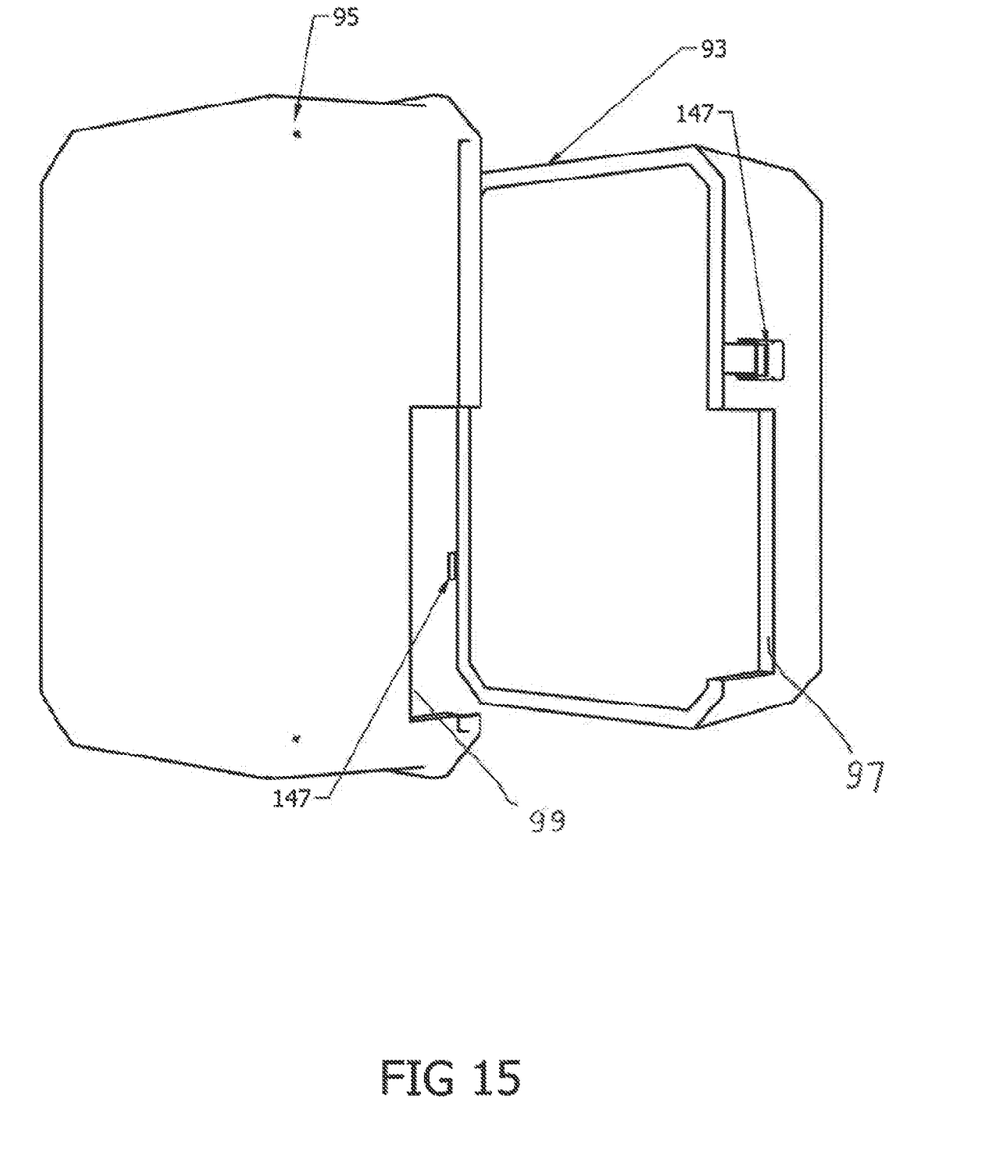
FIG. 15 is a view in perspective of an insulated enclosure in accordance with an embodiment of the invention.

As shown in FIGS. 1, 1A, and 14, the insulated enclosure 91 is attached to the assembled mount plate 3 and instrument plate 31 independent of either the instrument 51 or the tubing bundle 81, by slipping cutout 97 of enclosure section 93 over the collar 25, then slipping the cutout 99 of enclosure section 95 over the other side of collar 25, and then securing the enclosure sections to each other by latches 147. The free edges 27 and 29 of the mount plate leg 5 prevent forward movement of the enclosure 91, and the free edges 47 and 49 of the instrument plate 31 prevent rearward movement of the enclosure 91. Because the collar 25 and mating cutouts 97 and 99 are not circular, the enclosure 91 is prevented from rotating.

Removal of the enclosure 91 is easily accomplished by unfastening the sections from each other and slipping one or both of them off the collar 25.

Removal and replacement of the insulated box 75 is also easily accomplished by removing the screws or bolts holding it in place, without disturbing the tubing bundle 81, the enclosure 91, the instrument 51, the heater 71, the termination box 75, the junction box 77, the mount bracket 3, or any of their connections.

Numerous variations, within the scope of the invention, will occur to those skilled in the art. The following variations are merely by way of example.

The mounting plate may be formed in one piece. A thermal break may be provided between the instrument plate and the mount plate. One or both of the mount plate and the instrument plate may be insulated. The opening (cutouts) in the mating walls of the enclosure sections may be provided with a gasket or may be reinforced. A cutout may be provided in only one section of the enclosure. The enclosure may be mounted to the mounting plate in other ways. Vertical and horizontal insulated enclosures may be formed by the simple expedient of providing cutouts on a long side or a short side of the enclosure. The instrument may be mounted to the instrument plate by supports other than pipe stubs.

Standard sets of mount plates and instrument plates may be provided to accommodate different numbers and patterns of fluid conduits and electrical wires extending into the enclosure. Conversely, wiring and conduit paths may be standardized to accommodate a standard pattern of holes in the plates, or additional holes may be drilled as needed. The mount plate may be shaped differently and may be mounted to a stanchion or a structural element in different ways.

These variations are merely illustrative.

All patents, patent applications, and literature mentioned herein are hereby incorporated by reference.

The invention claimed is:

1. In combination, a process instrument having at least one operative connection to a fluid-carrying tube, an insulated enclosure surrounding the instrument, a ground-engaging support structure, and a support plate attached to the support structure and the instrument, the support plate supporting the instrument, wherein the support plate supports the insulated enclosure independent of the instrument, and wherein all tubing and electrical connections extending through the enclosure extend through the plate from outside the enclosure to inside the enclosure.

2. The combination of claim 1 wherein the enclosure comprises two separable sections, each section having an opening sized to engage a peripheral surface of the support plate, the enclosure being locked to the plate by attaching the two sections to each other.

3. The combination of claim 2 wherein the peripheral surface comprises spaced-apart protrusions, the protrusions being shaped and proportioned to engage inside and outside faces of the enclosure openings.

4. The combination of claim 1 further comprising an insulated casing for the tubing attached to the plate on a side of the plate opposite the insulated enclosure.

5. A method of mounting an instrument to a supporting structure and insulating the instrument, the method comprising:
   mounting a mounting plate to the supporting structure, the mounting plate having at least one opening therethrough,
   mounting at least one conduit through the plate, the conduit being supported by the plate,
   connecting the instrument to the conduit, the conduit supporting the instrument, supporting an insulated conduit casing from the plate on a first side of the plate, and
   supporting an insulated instrument enclosure on a second side of the plate.

6. The method of claim 5 wherein the conduit comprises an insulated jacket surrounding a portion of the conduit, the conduit further comprising a heated tracing element extending through the jacket, and further comprising a heater in the insulated instrument enclosure, the method comprising attaching the tracing element to the heater through an opening in the mounting plate.

7. The method of claim 6 wherein the tracing element is electrical, the tracing element and the heater being attached to an electrical source in a junction box outside the insulated instrument enclosure.

8. The method of claim 7 wherein the insulated jacket is terminated within the insulated conduit casing.

\* \* \* \* \*